United States Patent [19]

Parker et al.

[11] Patent Number: 4,952,351
[45] Date of Patent: Aug. 28, 1990

[54] METHOD OF FORMING A PLASTIC PANEL FOR COVERING AN INFLATABLE RESTRAINT

[75] Inventors: Kent L. Parker, Hanover; George Bleau, Rochester, both of N.H.

[73] Assignee: Davidson Textron Inc., Dover, N.H.

[21] Appl. No.: 334,286

[22] Filed: Apr. 6, 1989

[51] Int. Cl.$^5$ ............................................. B29C 67/22
[52] U.S. Cl. ................... 264/46.4; 264/46.5; 264/139
[58] Field of Search ............ 264/46.4, 139, 154, 264/46.5, 46.6, 46.7; 280/732

[56] References Cited

U.S. PATENT DOCUMENTS

| 3,708,179 | 1/1973 | Hulten | 280/732 |
| 3,951,427 | 4/1976 | Wilfert | 280/732 |
| 4,120,516 | 0/0000 | Takamatsu et al. | 264/46.7 |
| 4,246,213 | 0/0000 | Takamatsu et al. | 264/46.6 |

FOREIGN PATENT DOCUMENTS

| 56-118830 | 9/1981 | Japan | 264/46.5 |
| 60-166420 | 8/1985 | Japan | 264/46.4 |

Primary Examiner—Jan H. Silbaugh
Assistant Examiner—Allan R. Kuhns
Attorney, Agent, or Firm—John C. Evans

[57] ABSTRACT

A method for integrally molding a pre-assembled door within an instrument panel to provide a cover for a safety air cushion device includes the steps of molding the plastic instrument panel about and over the door in situ of a mold cavity and thereafter the step of removing a portion of the instrument panel which overlies the door to provide an opening therein to expose the door for opening movement with respect to the instrument panel upon deployment of the air cushion device. The invention further includes the resultant structure of an integrally molded door and instrument panel assembly having an opening formed in the instrument panel assembly for both defining a ledge to support the door and to define a path for impacting an air cushion device against the door to cause the door to be lifted from its integrally molded seat relationship on the ledge for further deployment of the air cushion device into the passenger compartment of a vehicle.

7 Claims, 3 Drawing Sheets

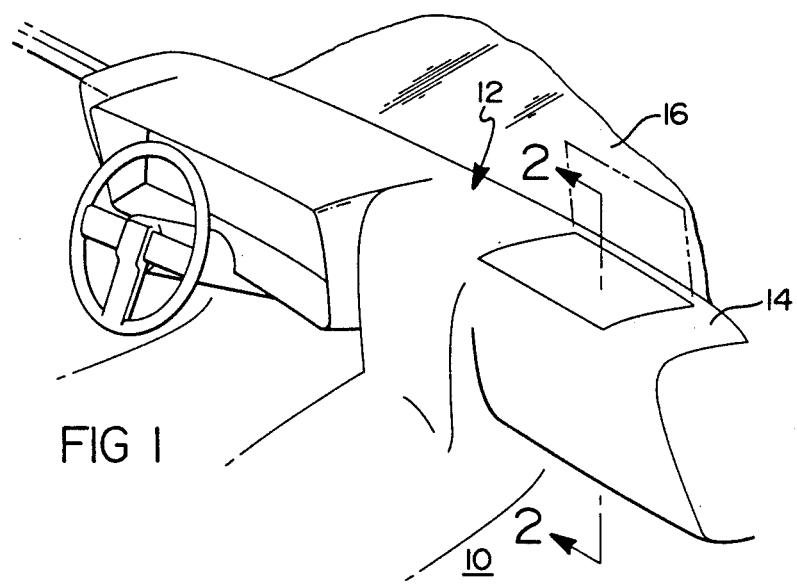
FIG 1
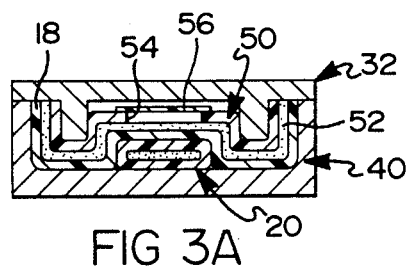
FIG 3
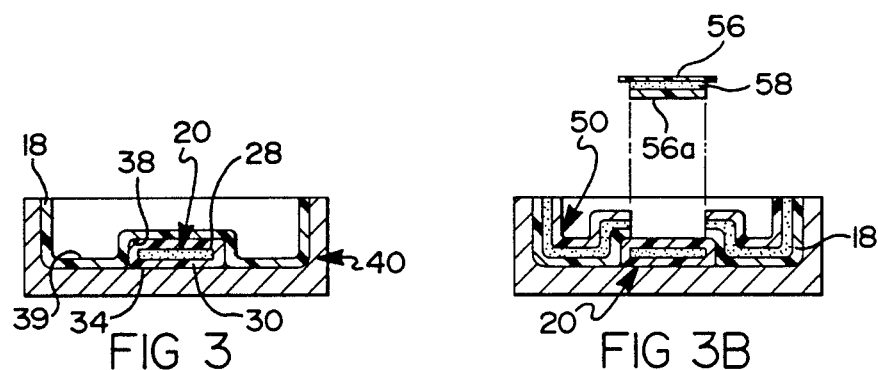
FIG 3A
FIG 3B
FIG 3C

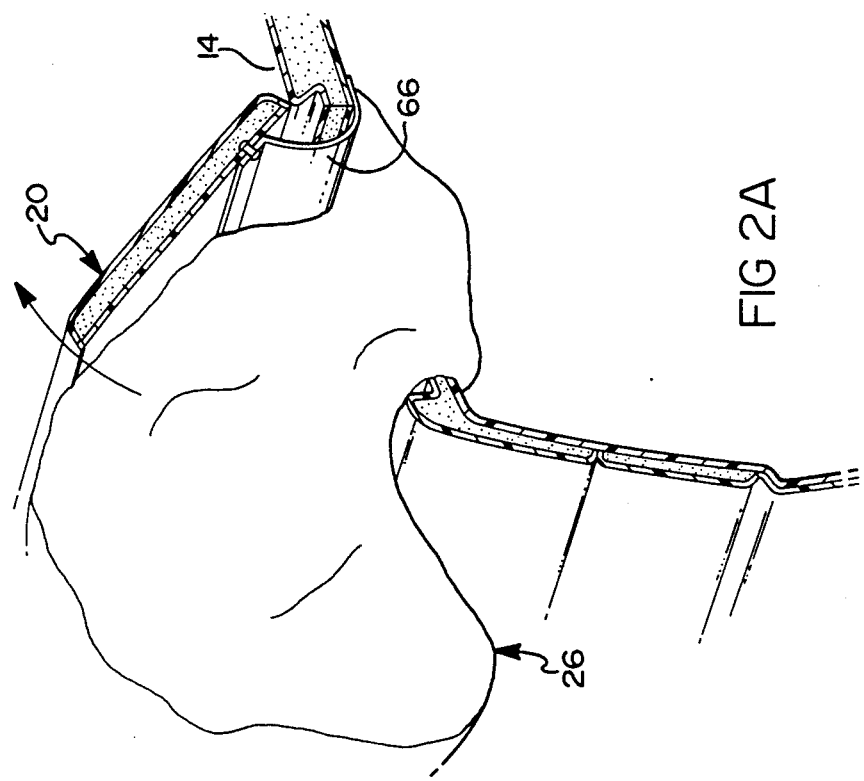
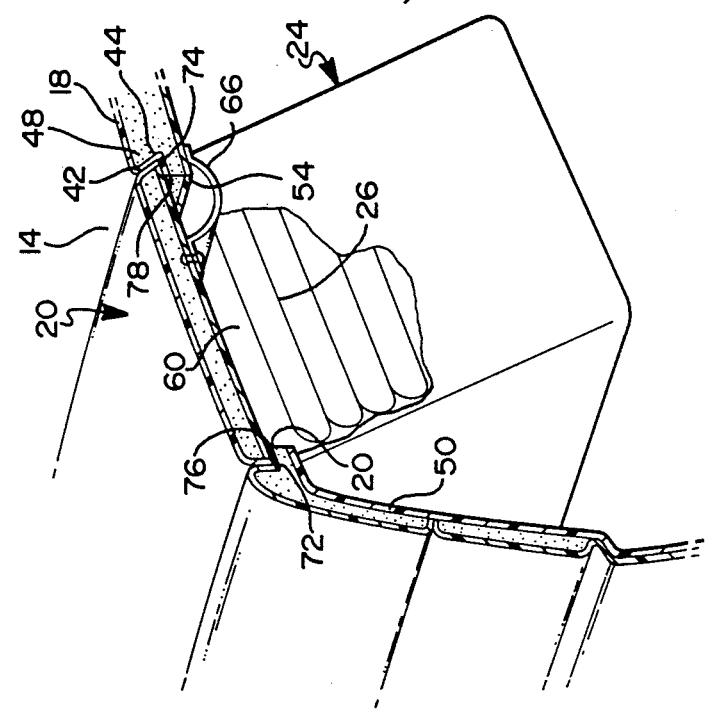
FIG 2A
FIG 2

METHOD OF FORMING A PLASTIC PANEL FOR COVERING AN INFLATABLE RESTRAINT

FIELD OF THE INVENTION

This invention relates to covers for safety air cushion devices and more particularly to a method for forming a molded in place door within an instrument panel which is openable to provide for deployment of an air cushion and to the a resultant door and instrument panel assembly made by such process.

DESCRIPTION OF THE PRIOR ART

Various methods have been proposed to form an integral cover over a deployable air cushion restraint located within the confines of an automotive interior part such as an instrument panel. One such method is set-forth in U.S. Pat. No. 4,246, 213 in which the cover member includes an outer skin of polyvinyl-chloride resin material backed by a layer of foamed polyurethane material. The method includes the step of pre-slitting or cutting the cover member to provide a weakened section therein which will rupture to provide an escape path in the cover member when the air cushion restraint is deployed into the passenger compartment.

U.S. Pat. No. 3,622,176 discloses a cover for a air cushion restraint system located in the forward passenger compartment in which the outer cover is weakened such that the air cushion will rupture the cover to provide a release path during its deployment.

U.S. Pat. No. 3,887,214 discloses a cover for an air cushion assembly in which overlapping molded segments swing outwardly to define a path for release of the air cushion into the passenger compartment. The overlapped molded segments are joined by a heat sealed joint which is ruptured to enable the molded segments to swing apart. Alternatively, a mechanical interconnect in the form of a ball socket strip can be formed to join the overlapping segments. In either case a deployment force is required to separate the cover before an opening is formed for deployment of the air cushion device.

U.S. Pat. No. 3,801,126 discloses a instrument panel in which an air cushion device is stored behind a cover or door which fits within an instrument panel opening. The instrument panel and the cover are separately fabricated and are assembled following molding of the component parts of the instrument panel. Furthermore, the cover has marginal covering flanges that must be separately joined to clip members of a separate manifold housing that contains an air bag of a particular form which applies a force on the door causing its rear and side marginal edges to tear free of the manifold clip members such that the door will swing inwardly of the passenger compartment as the air bag deploys.

In each of the aforesaid cases, the cover is either ruptured or a portion of the cover requires a separation force at a member portion thereof to either cause the production of an undesirable dispersion of particles into the passenger compartment during air cushion deployment or increase the rupture force required to deployment of the air cushion through its cover.

SUMMARY OF THE INVENTION

The present invention provides a method in which a cover or door for an air cushion restraint system is molded in situ of a interior trim component of a vehicle such as an instrument panel so as to improve the form and fit appearance of the interior of a passenger vehicle in which the air cushion restraint is located for deployment on vehicle impact.

A feature of the present invention is that a door component is molded in situ with an interior trim component of a vehicle to eliminate form and fit differences in separately formed and assembled parts thereby to improve the exterior appearance of the resultant product.

A further feature of the present invention is to provide a method for such in situ molding wherein the door has an interior trim panel molded above and around the door followed by removing a portion of the interior trim panel to provide an access opening to the door through which an air cushion can be deployed to protect vehicle passengers upon vehicle impact.

Still another feature of the present invention is to provide a method including such in situ molding and wherein the door component is initially placed in a mold cavity and thereafter covered with a outer skin of the interior trim panel after which the interior trim panel is foamed with a layer of polyurethane material to encapsulate the inboard face and sides of the door while leaving the outboard face thereof exposed and form fit with the surrounding outer skin of the interior trim panel and wherein the method includes the steps of removing a non-observable segment of the foam layer to expose the back or inboard surface of the door to an air cushion device covered by the interior trim panel and the door molded in situ therewith.

Another feature of this invention is to provide a cover for an air cushion device deployable into a passenger compartment to protect vehicle passengers upon vehicle impact wherein the cover includes a formed in situ door of a material which differs from the properties of a surrounding foamed-in-place interior trim panel while having a close tolerance form and fit relationship therewith and wherein the door is retained in the interior trim panel by die lock segments of the panel to mask any edge imperfections either in form or fit within the door component.

Still another feature of this invention is to provide a combination door and interior trim panel molded together to form a common perimeter defining the area through which a air cushion device is deployable upon vehicle impact and wherein the door is separable from the panel as a unit by impact through a rear access opening in the panel which is smaller than the door.

The above and other beneficial features, objects and advantages of the invention are attained in accordance with the present invention by a method which includes preforming a door for covering an air cushion device deployable into a passenger compartment upon vehicle impact wherein the door is molded in situ in a urethane foamed panel in the form of an instrument panel. The preformed door is first placed in a pocket of a vinyl skin of the instrument panel and the skin and door are placed with the outboard face of the door on the surface of a cavity component of foam tooling. A retainer of rigid load supporting material is placed in the mold tooling with an access hole formed therein which corresponds to the area of the door. The location of the retainer hole is selected such that the back of the door will be accessible from the back of a completed instrument panel component when the door is molded in situ therewith.

The skin, door and retainer are then foamed by directing foam precursors therebetween. The skin layer of the instrument panel is then removed at the retainer access opening thereby to expose the back of the door to an air cushion subject to deployment upon vehicle impact.

When the air cushion deploys it will impact against the back surface of the door to cause it to lift from the instrument panel up and out of the pocket in the instrument panel component so as to allow the air cushion to deploy into the passenger compartment without requiring that the skin cover of the molded part be prescored, weakened or ruptured to affect the air cushion release.

BRIEF DESCRIPTION OF THE DRAWINGS

In the accompanying drawings:

FIG. 1 is a perspective view of an instrument panel including the door construction of the present invention;

FIG. 2 is an enlarged perspective view, partially sectioned showing the instrument panel and door combination of the present invention along the line 2—2 of FIG. 1 looking in the direction of the arrows;

FIGS. 3–3c are schematic views of the method used to fabricate the constructions shown in FIGS. 1 and 2.

DETAILED DESCRIPTION OF PREFERRED EMBODIMENT

Figure 4:
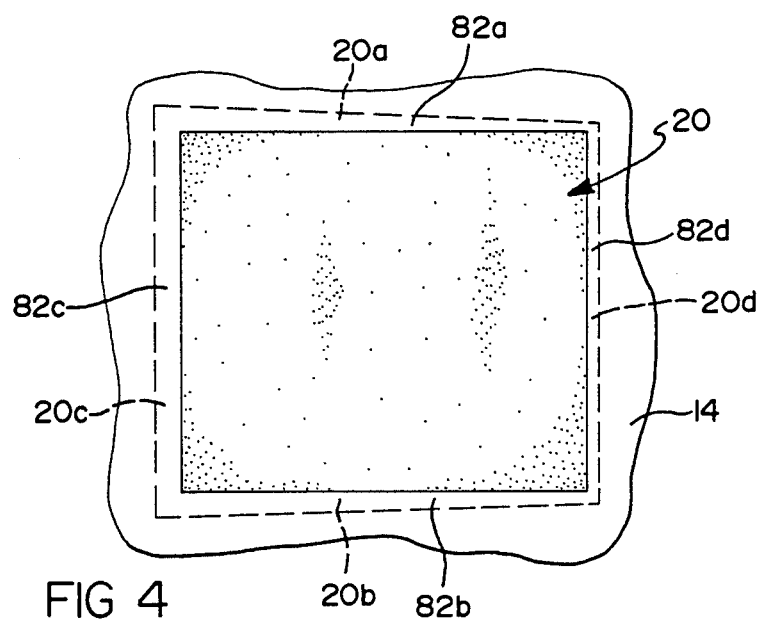
FIGS. 4 and 5 show different door, access opening and skin pocket configurations available for use in practicing the method and in the finished product of the present invention.

Referring now to FIGS. 1 and 2, a vehicle compartment 10 is shown having an interior trim component representatively shown as an instrument panel 12. For purposes of discussion the invention will be incorporated in the illustrated instrument panel 12 with it being understood that both the method and product formed by the method of the present invention are equally suitable for use with other vehicle components including door panels, consoles and headliner components.

The instrument panel 12 more particularly includes an upper surface 14 which is located forwardly and below the front windshield 16 of the vehicle.

The upper surface 14 is formed by an outer skin layer 18 which in one working embodiment is made from a relatively soft polyvinyl chloride resin material (PVC). The outer skin layer 18 has a door 20 located therein which closes a skin opening 22 to enclose an air cushion assembly 24 of a known type which has an inflatable bag 26 deployable through the outer skin layer 18 up and away from the windshield to protect a vehicle passenger upon vehicle impact.

In accordance with one aspect of the present invention the door 20 is molded in situ with the instrument panel 12 so as to define a precise form and fit relationship between the door and the instrument panel 12 at the opening 22 therein. Furthermore, the in situ molding process is accomplished by steps which enable the door 20 to separate from the rest of the instrument panel 12 during deployment of a bag portion 26 of the air cushion assembly 24 without breaking up the instrument panel in a manner which will produce undesirable generation of particles and debris as the bag 26 expands into the passenger compartment 10.

In the broadest aspect the inventive method integrally molds a pre-assembled door 20 having an inboard wall 28 of light impact resistant material such as aluminum or other suitable high strength material. The door 20 includes an outer shell or a PVC skin 30 material which can be of a similar softness and appearance as the skin 18 of the instrument panel 12. The skin 30 and wall 28 are bonded together by a layer of foamed urethane material which is foam molded by known methods in which the urethane foam precursors are injected into the space between the skin 30 and wall 28 in known reaction injection molding systems. The preassembled door 20 is loaded into mold tooling 32 and the plastic instrument panel 12 is molded about and over the back surface of the door leaving the outer surface 34 thereof as a continuation of the surface 14 for appearance.

In the process the instrument panel 12 has a portion thereof removed to expose the door to the bag 26 as it is deployed into the passenger compartment 10.

In particular, the method is characterized by removing a portion 36 of the instrument panel 12 as shown in FIG. 2 in broken line outline to make the opening for access to the door smaller in area than the area of the door 20.

Referring now to FIGS. 3–3C, the method of the present invention includes the steps of loading the door 20 into a pocket 38 formed in a preformed outer skin 18. The door 20 and outer skin 18 are then loaded onto the surface 39 of a cavity part 40 of the mold tooling 32 as is best seen in FIG. 3. As shown in FIG. 2, if desired a marginal side 42 of the door 20 ca be captured by a recessed segment 44 of the skin 18 to form a die-locked joint 46 between the door 20 and the skin 18 which holds the door 20 in place in the finished product and which includes an overlying strip segment 48 which masks any imperfections in the fit and finish of the door 20 and instrument panel 12 at the upper outer surface 14 thereof.

Once the door 20 and skin 18 are placed into the cavity part 40 an instrument panel retainer 50 is loaded into the cavity part 40 and is held in spaced relationship with the skin 18 and door 20 by suitable means well known in the art of reaction injection molding. Foam precursors are then directed into the space between the retainer 50 and the skin 18 to be reacted and foamed to form a foam layer 52 between the skin 18, pocketed door 20 and the spaced retainer 50. In the preferred process the retainer 50 is preformed with an access hole 54 therein which is in alignment with the pocketed door 20 to provide access thereto through the retainer 50. A suitable barrier member 56 closes the hole 54 during the foaming process.

Once the pocketed door 20 is foamed the process includes the steps of removing a segment 56a of the skin 18 and a part 58 of the foam layer 52 so as to expose the back surface or inboard face 60 of the door to the bag 26 during deployment.

Such deployment preferably takes place through an opening 62 in the instrument panel 12 which is smaller than the area of the door 20 so as to impose an initially higher unit force on the door 20 as the bag 26 moves upwardly and outwardly of its housing 64 as shown in FIG. 2 and 2A. The greater unit force allows the nose portion 42 to flex upwardly to form a fulcrum about which the door 20 pivots in the direction of the windshield thereby defining a full unimpeded deployment of the bag 26 upwardly and forwardly of the windshield 16 without production of unnecessary debris.

During operation of the door 20, a tether 66 connected between the door 20 and the retainer 50 will prevent separate flight of the door 20 into the passenger compartment.

The resultant door and instrument panel assembly 70 includes ledges 72, 74 formed integrally of the instrument panel by shell edges 76, 78 resulting from removal of the skin segment 56 and the foam segment 58 to from the access opening 60 to the backside of the door 20.

Figure 5:
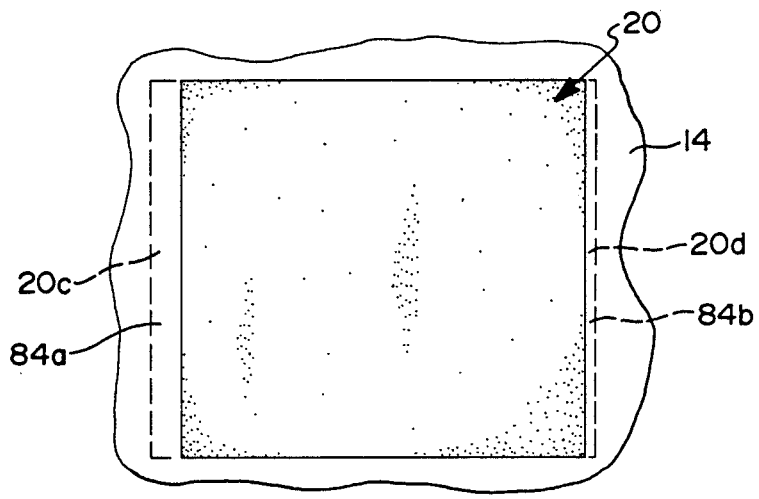

As shown in FIGS. 4 and 5 the door can have different shapes and greater or lesser amounts of overlap by die-locked segments. For example in FIG. 4 the marginal edges 20a–20d of the door are all overlapped by die-locked segments 82a–82d respectively. In FIG. 5 only end marginal edges 20c–20d are overlapped by die-locked segments 84a–84b.

The invention has been described in an illustrative manner, and it is to be understood that the terminology which has been used is intended to be in the nature of words of description rather than of limitation.

Obviously, many modifications and variations of the present invention are possible in light of the above teachings. It is therefore, to be understood that within the invention other forms can be practiced other than as specifically described herein and yet remain within the scope of the appended claims.

The embodiments of the invention in which an exclusive property or privilege is claimed are defined as follows:

1. A method for integrally molding a pre-assembled door within a plastic panel of an interior trim product for an automobile wherein the plastic panel has an inboard surface and an outer appearance surface, comprising the steps of:
   (a) molding said plastic panel about and over said door by providing an assembly of said pre-assembled door in a pocket of an outer skin of said plastic panel and thereafter loading said assembly in a mold cavity, and forming a foamed layer by foaming said layer against an inboard surface of said outer skin, thereby encapsulating an inboard face and sides of said door while leaving an outboard face thereof exposed and form fit with a surrounding outer skin of said plastic panel; and
   (b) removing a portion of said foamed layer and said outer skin of said plastic panel overlying said door to define an opening therein to expose said inboard face of the door for operation of the door from the inboard surface of the plastic panel.

2. A method as set forth in claim 1, further comprising removing a portion of the plastic panel to make the opening smaller in periphery than the periphery of the door.

3. A method as set forth in claim 1 further comprising the steps of removing a segment of the foam layer and a segment of the outer skin located inboard of the plastic panel to expose the inboard surface of the door for operation by an air cushion device coverable by the plastic panel and the door molded in situ therewith.

4. A method as set forth in claim 1 further comprising the steps of preforming an outer skin for the plastic panel to have a pocket therein with die-lockable segments forming at least a part of the perimeter of the pocket;
   loading the pre-assembled door in the pocket with the die-lockable segments overlapping at least a part of the periphery of the door; and
   placing the assembly in a foaming mold and forming the foamed layer against the outer skin behind and around the periphery of the door to form an integral door and panel product.

5. A method as set forth in claim 4 further comprising the steps of forming the outer skin and the foamed layer thereof as an instrument panel having a flat upper surface adapted to be located below and inside a front vehicle windshield and pocketing the pre-assembled door in the upper surface for release from the instrument panel in a swinging movement about one of the edges of the door.

6. A method as set forth in claim 1 further comprising by the steps of providing the plastic panel with an outer skin; and preforming the outer skin to have a pocket to receive the preassembled door in the step of molding the panel about and over the door.

7. A method as set forth in claim 6 further comprising preforming the outer skin to have die lockable edges around the pocket overlapping at least a portion of the periphery of the door to retain the door securely within the outer skin following molding of the panel about and over the door.

* * * * *